(12) United States Patent
Shiraishi et al.

(10) Patent No.: US 11,466,737 B2
(45) Date of Patent: Oct. 11, 2022

(54) BRAKE DISC FOR RAILWAY VEHICLE

(71) Applicants: NIPPON STEEL & SUMITOMO METAL CORPORATION, Tokyo (JP); EAST JAPAN RAILWAY COMPANY, Tokyo (JP)

(72) Inventors: Nobuo Shiraishi, Tokyo (JP); Yusuke Wakabayashi, Tokyo (JP); Takeshi Kurita, Tokyo (JP); Takanori Kato, Tokyo (JP); Takahiro Fujimoto, Tokyo (JP); Hiroshi Nogami, Tokyo (JP); Atsushi Sakaguchi, Tokyo (JP); Yuki Ichikawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 49 days.

(21) Appl. No.: 15/781,549

(22) PCT Filed: Dec. 6, 2016

(86) PCT No.: PCT/JP2016/086223
§ 371 (c)(1),
(2) Date: Jun. 5, 2018

(87) PCT Pub. No.: WO2017/099073
PCT Pub. Date: Jun. 15, 2017

(65) Prior Publication Data
US 2019/0017559 A1 Jan. 17, 2019

(30) Foreign Application Priority Data

Dec. 8, 2015 (JP) .............................. JP2015-239099

(51) Int. Cl.
*F16D 65/847* (2006.01)
*F16D 65/00* (2006.01)
(Continued)

(52) U.S. Cl.
CPC ........... *F16D 65/0006* (2013.01); *B61H 5/00* (2013.01); *F16D 65/12* (2013.01); *F16D 65/124* (2013.01);
(Continued)

(58) Field of Classification Search
CPC .... F16D 65/124; F16D 65/127; F16D 65/128; F16D 65/847; F16D 2065/1328; F16D 2065/788; F16D 2065/789
See application file for complete search history.

(56) References Cited

U.S. PATENT DOCUMENTS 2,374,859 A * 5/1945 Gaenssle .................. B61H 5/00
74/559
3,391,763 A * 7/1968 Severson .............. F16D 65/128
188/218 XL
(Continued)

FOREIGN PATENT DOCUMENTS

DE 3603555 A1 8/1986
DE 3839073 A1 5/1990
(Continued)

OTHER PUBLICATIONS

European Search Report of EP Application No. 16872972.1, dated Nov. 16, 2018.
(Continued)

*Primary Examiner* — Robert A. Siconolfi
*Assistant Examiner* — Stephen M Bowes
(74) *Attorney, Agent, or Firm* — Greer Burns & Crain Ltd.

(57) ABSTRACT

A brake disc for a railway vehicle includes: a disc plate portion that has a sliding portion of a front face; a plurality of radial fins that are provided on the rear face of a disc plate portion, and that have a shape that extends in the radial direction of the disc plate portion; and a circumferential rib
(Continued)

that is provided between each pair of adjacent radial fins, and that has a shape that extends in the circumferential direction of the disc plate portion. A flow path for air is formed between the pair of radial fins, and the flow path for air is narrowed by the circumferential rib. On the circumferential rib, a gradual slope for suppressing fluctuations in an airflow that passes between the pair of radial fins is provided from a base part to a top part.

7 Claims, 15 Drawing Sheets

(51) Int. Cl.
  *B61H 5/00* (2006.01)
  *F16D 65/12* (2006.01)
  *F16D 55/224* (2006.01)
  *F16D 65/02* (2006.01)
(52) U.S. Cl.
  CPC ........ *F16D 65/127* (2013.01); *F16D 55/2245* (2013.01); *F16D 65/128* (2013.01); *F16D 2065/1304* (2013.01); *F16D 2065/138* (2013.01); *F16D 2065/1332* (2013.01); *F16D 2065/1384* (2013.01); *F16D 2065/1396* (2013.01)

(56) References Cited

U.S. PATENT DOCUMENTS

| | | | | |
|---|---|---|---|---|
| 5,682,971 | A | * 11/1997 | Takakura | ............ F16D 13/648 192/107 R |
| 2004/0118644 | A1 | * 6/2004 | Oberti | .................. B22C 7/06 188/218 XL |
| 2008/0067018 | A1 | * 3/2008 | Smith | .................... F16D 65/12 188/218 XL |
| 2012/0090929 | A1 | * 4/2012 | Lathwesen | ............ F16D 65/123 188/218 XL |
| 2017/0002879 | A1 | * 1/2017 | Maronati | .............. F16D 65/128 |

FOREIGN PATENT DOCUMENTS

| | | | | |
|---|---|---|---|---|
| GB | 1580509 | A * | 12/1980 | ........... F16D 13/648 |
| GB | 2481112 | A * | 12/2011 | ........... F16D 65/128 |
| JP | 59194139 | A | 11/1984 | |
| JP | 60237234 | A | 11/1985 | |
| JP | 08312698 | A | 11/1996 | |
| JP | 09100852 | A | 4/1997 | |
| JP | 2006009862 | A | 1/2006 | |
| JP | 2006125553 | A | 5/2006 | |
| JP | 2007205428 | A | 8/2007 | |
| JP | 2009002375 | A | 1/2009 | |
| WO | WO-2012146665 | A2 * | 11/2012 | ............. F16D 65/12 |
| WO | 2015122146 | A1 | 8/2015 | |
| WO | 2015122148 | A1 | 8/2015 | |

OTHER PUBLICATIONS

Supplemental European Search Report of EP Application No. 16872971.3, dated Nov. 16, 2018.
Int'l. Search Report issued in Int'l. App. No. PCT/JP2016/086223, dated Mar. 7, 2017.

* cited by examiner

- *1  Standard
- *2  Only Openings on Outer Circumferential Side Open
- *3  Only Openings on Inner Circumferential Side Open
- *4  Only Bolt Holes Blocked
- *5  First Embodiment

- *1  Standard
- *2  All Blocked
- *3  Only Bolt Holes Open
- *4  Only Bolt Holes Blocked
- *5  Second Embodiment : Only Bolt Holes Open

FIG.9

| | Circumferential rib Cross-Sectional Shape | |
|---|---|---|
| L1 | Ld, SL0, SL1 | Vertex Horizontal Portion: 10mm<br>Top-part Gradual Slope: R48<br>Base-part Gradual Slope: R10 |
| L2 | Ld, SL0, SL1 | Vertex Horizontal Portion: 10mm<br>Top-part Gradual Slope: R20<br>Base-part Gradual Slope: R10 |
| L3 | Ld, SL0, SL1 | Vertex Horizontal Portion: 5mm<br>Top-part Gradual Slope: R20<br>Base-part Gradual Slope: R10 |
| L4 | Ld, SL0, SL1 | Vertex Horizontal Portion: 5mm<br>Top-part Gradual Slope: R10<br>Base-part Gradual Slope: R10 |
| L5 | SL0, SL1 | Vertex Horizontal Portion: None<br>Top-part Gradual Slope: R10<br>Base-part Gradual Slope: R10 |
| PRIOR ART L6 | | Vertex Horizontal Portion: None<br>Top-part Gradual Slope: None<br>Base-part Gradual Slope: None |

One-third Octave Band Center Frequency [Hz]

FIG.12

| Test Number | Top-part Gradual Slope Shape | Section La1 Length | Section La2 Length | Straight Line Section Lb Angle | Base-part Gradual Slope Shape |
|---|---|---|---|---|---|
| P1 | R2 | 2mm | 2mm | *1 | R5 |
| P2 | R5 | 5mm | 2mm | *1 | R5 |
| P3 | R10 | 10mm | 10mm | *1 | R5 |
| P4 | R20 | 20mm | 20mm | *1 | R5 |
| P5 | R10 | 5mm | 5mm | *1 | R5 |
| P6 | R10 | 6.5mm | 6.5mm | *1 | R5 |
| P7 | R10 | 10mm | 10mm | *2 | R5 |

*1 Substantially Vertical
*2 45 Degrees

\*1 No Groove
\*2 Center Portion - 5 mm
\*3 Center Portion - 10 mm
\*4 Center Portion - 20 mm

*1  No Groove
*2  Center Portion - 10 mm
*3  Inner Circumferential Portion - 10 mm
*4  Outer Circumferential Portion -10 mm
*5  Staggered - 10 mm
*6  Diagonal - 10 mm

BRAKE DISC FOR RAILWAY VEHICLE

This is a National Phase Application filed under 35 U.S.C. § 371, of International Application No. PCT/JP2016/086223, filed Dec. 6, 2016, the contents of which are incorporated by reference.

TECHNICAL FIELD

The present invention relates to a brake disc for a railway vehicle that is fastened to a wheel of a railway vehicle and generates a braking force by means of a sliding-contact member being pushed against a sliding portion.

BACKGROUND ART

There are brake systems already in use which, with a brake disc fastened to a wheel of a railway vehicle, slows or stops rotation of the wheel by pushing a sliding-contact member against the brake disc. In such brake systems, a large amount of frictional heat arises at the brake disc during braking. Therefore, in some cases a structure is adopted in which a plurality of radial fins that extend in the radial direction are provided on the rear face of the brake disc to thereby cause air to flow between the brake disc and the wheel by rotation of the brake disc and thereby release heat from the brake disc.

In the case of a brake disc that has a plurality of radial fins, when the brake disc is mounted in a rapid-transit railway vehicle and a wheel with the brake disc rotates at a high speed, a large amount of air flows between the brake disc and the wheel and generates a large noise. Therefore, Patent Literature 1 proposes to provide a circumferential rib that imparts resistance to air flowing between a plurality of radial fins and adjust an opening area between the radial fins by means of the circumferential rib, for suppressing the amount of air that flows between the plurality of radial fins to thereby reduce noise.

CITATION LIST

Patent Literature

Patent Literature 1: JP2007-205428A

SUMMARY OF INVENTION

Technical Problem

By providing a circumferential rib in a brake disc that has a plurality of radial fins as described in Patent Literature 1, noise can be reduced in comparison to a case where a brake disc has no circumferential rib. However, in the case of the brake disc described in Patent Literature 1, in order to reduce the noise that arises as the air flow rate increases due to an additional increase in speed, it is necessary to further reduce an opening area between the circumferential rib and the wheel. When the opening area is reduced in this way, the problem arises that, because of a reduction in the air flow rate, the heat-release performance of the brake disc cannot be adequately secured.

The present inventors performed tests to ascertain the sound sources of a brake disc for the purpose of developing a low-noise brake disc that does not lower the heat-release performance of the brake disc.

First, the sound sources of a brake disc rotating at high speed as well as sound sources around the brake disc were investigated using a microphone array sound source location system. As a result, it was revealed that sound sources are present in the vicinity of the brake disc and within the brake disc. Next, a test was performed in which each portion of the brake disc that was thought to generate a turbulent flow that became a noise source was blocked up. Specifically, the term "each portion" refers to an inlet (opening portion on the inner circumferential side of the brake disc) and an outlet (opening portion on the outer circumferential side of the brake disc) of a flow path for air on the disk rear face, and an opening end on the disk front face (sliding portion) side of each through-hole through which a bolt for fastening the brake disc to a wheel is inserted. It was confirmed that, as the result of blocking up all of the aforementioned portions and performing a noise test, the noise generated from the brake disc was reduced to an extremely low level. Further, a test was performed in which one location among the aforementioned locations was not blocked up, and the remaining two locations were blocked up. As a result it was confirmed that noise of a specific frequency is generated at the respective portions.

However, it was found that even when all of the aforementioned noises were added together, the noise level was lower than at a normal time, that is, a state in which all the regions are open. In particular, there was a large difference in a high frequency range of 800 Hz or more.

The present inventors analyzed the results of these tests, and reached the conclusion that noise caused by fluctuations in an airflow on the brake disc rear face is the largest factor, and completed the present invention by performing tests in which the shape of a circumferential rib that produces fluctuations in such an airflow was changed in various ways.

An objective of the present invention is, with respect to a brake disc for a railway vehicle, to significantly reduce noise that arises from a brake disc during high-speed rotation of a wheel, without lowering the heat-release performance of the brake disc.

Solution to Problem

The present invention is a brake disc for a railway vehicle that includes: a disc plate portion having a sliding portion on a front face (a plate-like portion excluding radial fins and a circumferential rib and the like that are described below of the brake disc is referred to as a "disc plate portion"); a plurality of radial fins provided on a rear face of the disc plate portion and having a shape extending in a radial direction of the disc plate portion; a circumferential rib provided between each pair of radial fins that are adjacent among the plurality of radial fins, and having a shape extending in a circumferential direction of the disc plate portion; wherein: a flow path for air that runs from an inner circumferential side to an outer circumferential side of the disc plate portion is formed between the pair of radial fins in a state in which the disc plate portion is fastened to a wheel of a railway vehicle, and the flow path for air is narrowed by the circumferential rib; and a gradual slope for suppressing fluctuations in an airflow that passes between the pair of radial fins is provided on the circumferential rib on a side face along the radial direction of the disc plate portion.

According to this configuration, an action whereby air passing between a pair of radial fins is disturbed by a circumferential rib and generates a large noise is suppressed, and by this means noise that is generated from the brake disc during high-speed rotation can be reduced by a large margin. Therefore, noise can be reduced by a large margin without reducing the area of an opening portion between the circumferential rib and the wheel which influences the heat-release performance.

Preferably, the gradual slope may be provided on one side face of the circumferential rib that faces the inner circumferential side along the radial direction of the disc plate portion, or on both side faces of the circumferential rib that face the inner circumferential side and the outer circumferential side, respectively, along the radial direction of the disc plate portion.

According to this configuration, by at least one of the side faces of the circumferential rib being formed to have a gradual slope facing toward the inner circumferential side along the radial direction of the disc plate portion, noise that is generated by fluctuations in an airflow that passes the circumferential rib can be reduced.

More preferably, the gradual slope may have a configuration including a top-part gradual slope that is provided at least at a top part of the circumferential rib, wherein the top-part gradual slope is a convex curved face having a radius of curvature of 2 mm or is a sloping face which is more gradual than the convex curved face, the top-part gradual slope being provided at a side portion facing the inner circumferential side of the disc plate portion, at a section of 2 mm or more in the radial direction of the disc plate portion, and at a section of 2 mm or more in a rotational axis direction of the disc plate portion from a vertex of the circumferential rib.

More preferably, the gradual slope may have a configuration having a top-part gradual slope that is provided at least at a top part of the circumferential rib, wherein the top-part gradual slope is a convex curved face having a radius of curvature of 5 mm or is a sloping face which is more gradual than the convex curved face, the top-part gradual slope being provided at a side portion facing the inner circumferential side of the disc plate portion, at a section of 5 mm or more in the radial direction of the disc plate portion, and at a section of 5 mm or more in a rotational axis direction of the disc plate portion from a vertex of the circumferential rib.

According to these configurations, noise generated at the circumferential rib can be reduced without increasing the volume of the circumferential rib. When the brake disc undergoes thermal expansion and thermal contraction, and hence stress fluctuations arise in a bolt that fastens the brake disc to the wheel and the volume of the circumferential rib increases, the rigidity of the brake disc increases, and hence the stress range of the bolt increases. According to the above configurations, because the volume of the circumferential rib can be made small, the stress range that arises in a bolt can be made small while also reducing the noise.

Specifically, a configuration is adopted in which the circumferential rib connects the pair of radial fins, and which has a flow path for air between the wheel and the circumferential rib.

In this configuration, the aforementioned effect of reducing noise that is realized by the gradual slope is obtained to a further degree.

Advantageous Effects of Invention

According to the present invention, in a brake disc for a railway vehicle, noise that arises from the brake disc during high-speed rotation of a wheel can be reduced by a large margin without lowering the heat-release performance of the brake disc.

BRIEF DESCRIPTION OF DRAWINGS

FIG. 9 is a chart for describing a first form L1 to a fifth form L5 of the circumferential rib and a comparative form L6 shown in FIG. 8.

FIG. 12 is a chart that shows the forms of the circumferential ribs that are compared in FIG. 11.

FIG. 14 is a multiple view drawing for describing the forms of grooves provided in a front face of a disc plate portion, in which FIG. 14A to FIG. 14E show a first form to a fifth form, respectively.

DESCRIPTION OF EMBODIMENTS

Hereunder, respective embodiments of the present invention are described in detail referring to the accompanying drawings.

First Embodiment

Figure 1:
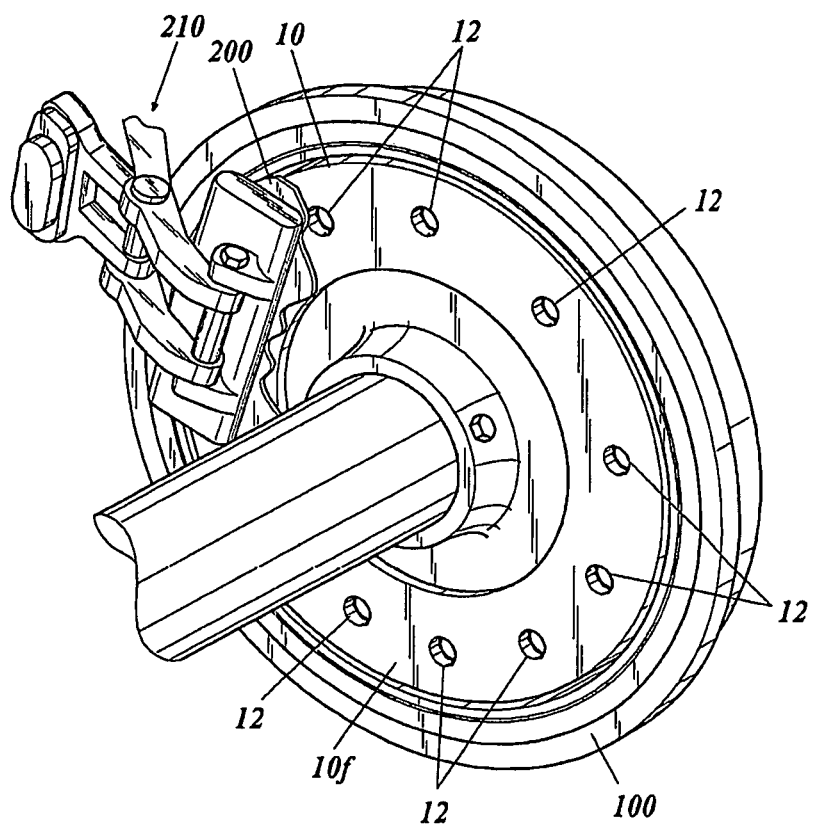
FIG. 1 is a perspective view illustrating one example of a brake system in a railway vehicle.
Figure 2:
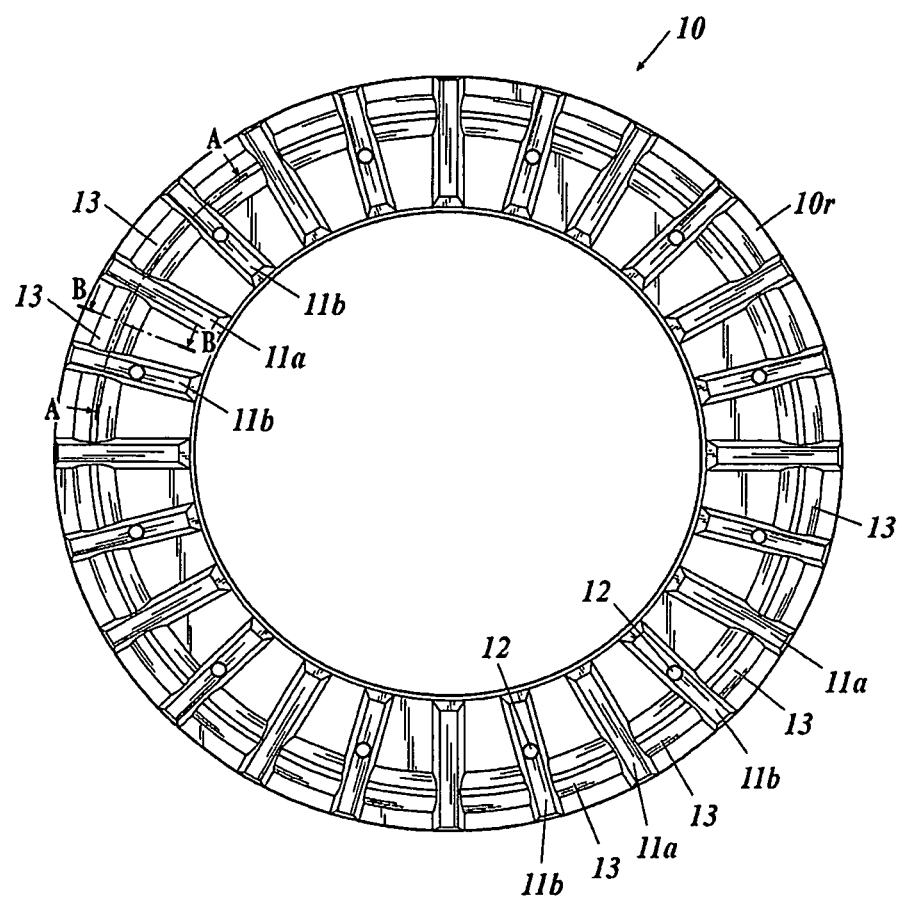
FIG. 2 is a plan view illustrating the rear face of a brake disc of a first embodiment.
Figure 3A:
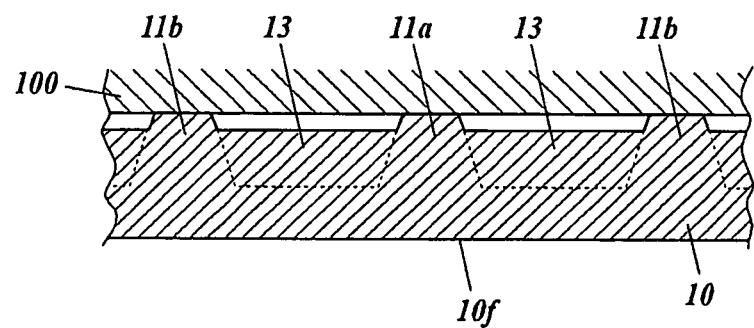
FIG. 3A is a cross-sectional view along a line indicated by arrows A-A in FIG. 2, that shows a cross-section of respective portions of the brake disc.
Figure 3B:
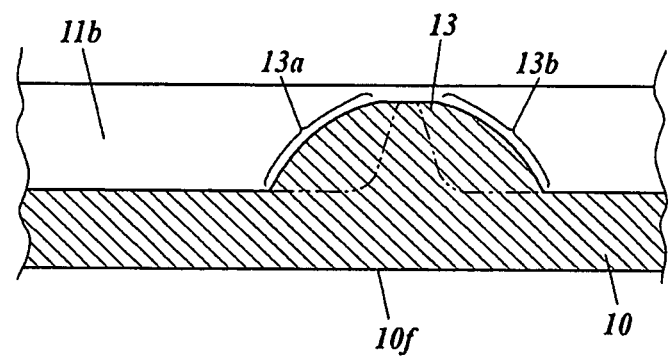
FIG. 3B is a cross-sectional view along a line indicated by arrows B-B in FIG. 2, that shows a cross-section of respective portions of the brake disc.
Figure 3C:
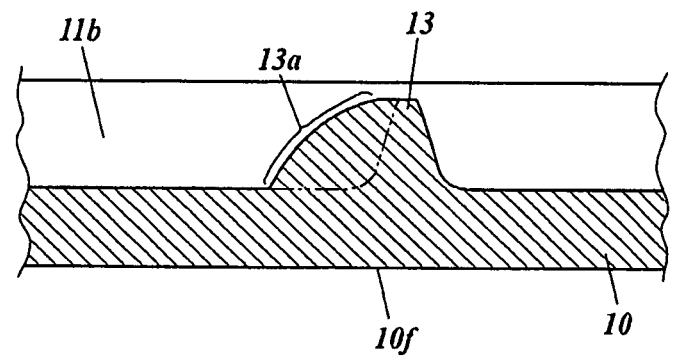
FIG. 3C is a cross-sectional view along a line indicated by arrows B-B in FIG. 2, that shows a cross-section of respective portions of the brake disc, and which shows a modification of the circumferential rib.

FIG. 1 is a perspective view that illustrates one example of a brake system in a railway vehicle. FIG. 2 is a plan view that illustrates a rear face of a brake disc of a first embodiment. FIG. 3 is a multiple view drawing illustrating cross-sections of respective portions of the brake disc, in which FIG. 3A is a cross-sectional view along a line indicated by arrows A-A in FIG. 2, FIG. 3B is a cross-sectional view along a line indicated by arrows B-B in FIG. 2, and FIG. 3C is a cross-sectional view along a line indicated by arrows B-B in FIG. 2, which shows a modification of a circumferential rib.

Hereunder, a side facing toward an outer circumference along a radial direction of a brake disc 10 is defined as an "outer circumferential side", and a side facing toward an inner circumference along the radial direction of the brake disc 10 is defined as an "inner circumferential side".

A brake system of the first embodiment of the present invention is mounted in a rapid-transit railway vehicle. The brake system includes: the brake disc 10 that is fastened to a side portion of a wheel 100 of the railway vehicle, a sliding-contact member 200 that contacts against the brake disc 10 to generate a braking force, and a movable portion 210 that is capable of pressing the sliding-contact member 200 in a direction in which the sliding-contact member 200 contacts the brake disc 10. Although the configuration is not particularly limited, the brake disc 10 and the sliding-contact member 200 are each provided on both side faces of each wheel 100, and the movable portion 210 is configured to sandwich the wheel 100 by means of two of the sliding-contact members 200.

The brake disc 10 is an annular disc, and a front face 10f of a disc plate portion is a sliding portion. A plurality of radial fins 11a and 11b, and a plurality of circumferential ribs 13 are provided on a rear face 10r of the disc plate portion. In the brake disc 10, a plate-like portion that excludes the radial fins 11a and 11b and the circumferential ribs 13 is called a "disc plate portion".

Further, a plurality of through-holes 12 for passing bolts through from the front face to the rear face are provided in the brake disc 10. In FIG. 2, to avoid complication of the illustration, only some of the radial fins 11a and 11b, the through-holes 12, and the circumferential ribs 13 are denoted by reference characters.

The radial fins 11a and 11b are portions having a shape extending in the radial direction of the disc plate portion which protrude from the rear face of the disc plate portion toward a plate portion of the wheel 100. The plurality of radial fins 11a and 11b are provided at approximately even intervals in the circumferential direction of the disc plate portion.

The circumferential rib 13 has a shape that extends in the circumferential direction of the disc plate portion, and is provided between each pair of adjacent radial fins 11a and 11b among the plurality of radial fins 11a and 11b so as to connect the relevant pair of radial fins 11a and 11b.

The plurality of through-holes 12 are provided on the same diameter of the disc plate portion, and are aligned at even intervals in the circumferential direction of the disc plate portion.

As illustrated in FIG. 3A, a top part of the radial fins 11a and 11b contacts a side face of the wheel 100. The circumferential rib 13 has a height such that a gap exists between the top part of the circumferential rib 13 and the wheel 100. By means of this configuration, when the brake disc 10 is fastened to the wheel 100, a flow path for air is formed that is surrounded by the radial fins 11a and 11b, the rear face 10r of the disc plate portion, and the plate portion of the wheel 100. Further, when the wheel 100 and the brake disc 10 rotate, air flows from the inner circumferential side to the outer circumferential side through the aforementioned flow path, and by this means heat of the brake disc 10 is released.

Figure 7:
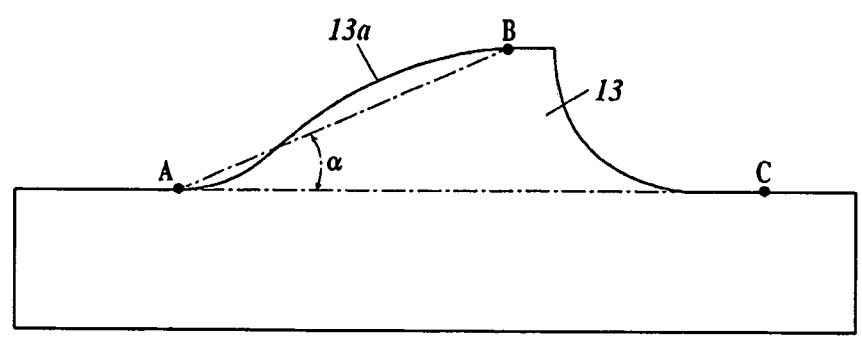
FIG. 7 is a view for describing an average inclination angle of a gradual slope.

In the present embodiment a gradual slope is formed on a side face 13a on the inner circumferential side and on a side face 13b on the outer circumferential side of the circumferential rib 13. The inclination angle of the gradual slope is smaller than the casting draft angle, and preferably the gradual slope is formed with an average inclination angle of 50° or less, and more preferably with an average inclination angle of 45° or less. The term "draft angle" means, when the brake disc 10 is cast, a gradient that is closest to 90° among gradients that enable the circumferential rib 13 to be molded and extracted from the mold without performing undercut processing. In FIG. 3B and FIG. 3C, the draft angle is indicated by an imaginary line. In the gradual slope of the circumferential rib 13, the average inclination angle is less than the slope of the side faces of the radial fins 11a and 11b. Here, the term "average inclination angle" means, as illustrated in FIG. 7, an angle α formed by a straight line A-B linking an end point A of rounding processing on a base side on the side face 13a of the circumferential rib 13 and an end point B of rounding processing on a top side of the side face 13a, and a straight line A-C that is parallel to the plate surface of the brake disc 10.

The side faces 13a and 13b having a gradual slope of the circumferential rib 13 may be formed to have a curved surface shape having a bulge, or to have a curved surface shape having a hollow, or to have a flat surface or circular conical surface shape.

The actions of the brake disc 10 of the first embodiment will be described later.

Second Embodiment

Figure 4A:
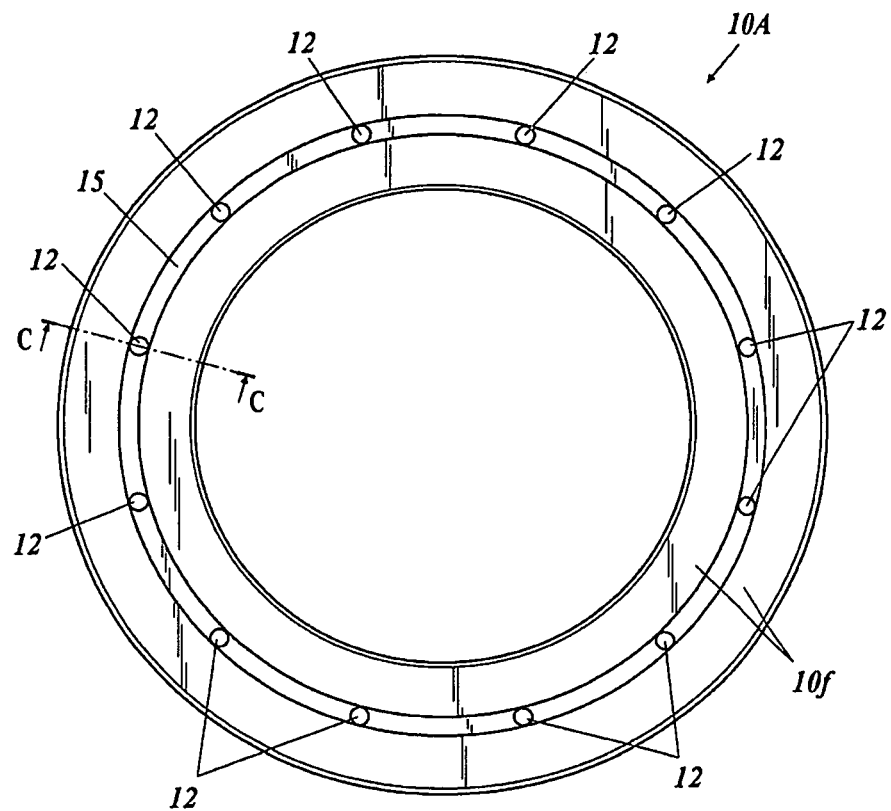
FIG. 4A is a plan view of a front face side of the brake disc, that illustrates a brake disc according to a second embodiment.
Figure 4B:
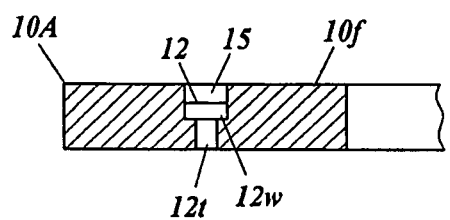
FIG. 4B is a cross-sectional view along a line indicated by arrows C-C in FIG. 4A, that illustrates the brake disc according to the second embodiment.

FIG. 4 is a multiple view drawing illustrating a brake disc according to a second embodiment, in which FIG. 4A is a plan view of a front face side (sliding portion side) of the brake disc, and FIG. 4B is a cross-sectional view along a line indicated by arrows C-C in FIG. 4A.

Similarly to the first embodiment, the brake system of the second embodiment of the present invention is mounted in a rapid-transit railway vehicle. In the brake system, a brake disc 10A is fastened to a side portion of the wheel 100 (FIG. 1) of the railway vehicle, and the sliding-contact member 200 (FIG. 1) is pushed against the front face of the brake disc 10A to generate a braking force.

A plurality of through-holes 12 that pass through from a front face 10f to the rear face, and a groove 15 that links the plurality of through-holes 12 on the front face 10f are provided in the brake disc 10A.

The plurality of through-holes 12 are provided on the same diameter of the brake disc 10A, and are provided at even intervals in the circumferential direction of the brake disc 10A. As illustrated in FIG. 4B, each through-hole 12 has a minor diameter portion 12t with a small diameter which allows the shaft of a bolt to pass therethrough, and a major diameter portion 12w with a large diameter at which the head of a bolt or a nut is to be disposed. The major diameter portion 12w may have a depth such that the head of a bolt or a nut sinks therein, or may have a configuration in which the depth thereof is shorter than the height of the head of a bolt or a nut, and a part of the head of a bolt or a nut projects into the groove 15. Further, the depth of the major diameter portion 12w may be made the same as the height of the head of a bolt or a nut. In each of these cases, the head of the bolt or the nut does not project further outward than the front face 10f of the brake disc 10.

The groove 15 is formed in an annular shape so as to link the plurality of through-holes 12 in the front face part of the brake disc 10A. The groove 15 is provided, for example, such that the shape thereof is along a concentric circle of the brake disc 10A.

The structure that links the plurality of through-holes 12 by means of the groove 15 may be adopted in the brake disc 10 having the radial fins 11a and 11b and the circumferential ribs 13 of the first embodiment, or may be adopted in a brake disc having a different structure to the first embodiment.

<Actions and Effects>

Figure 5:
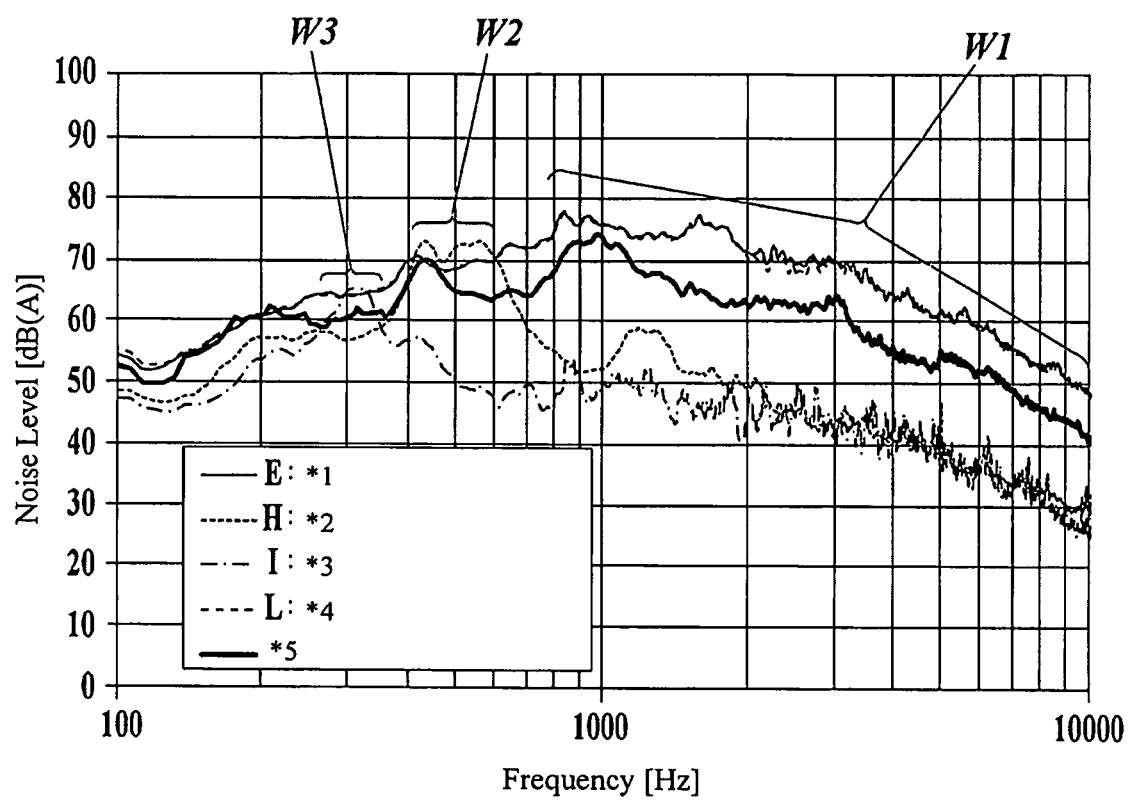
FIG. 5 is a graph showing test results with respect to noise relating to a radial fin and a circumferential rib.
Figure 6:
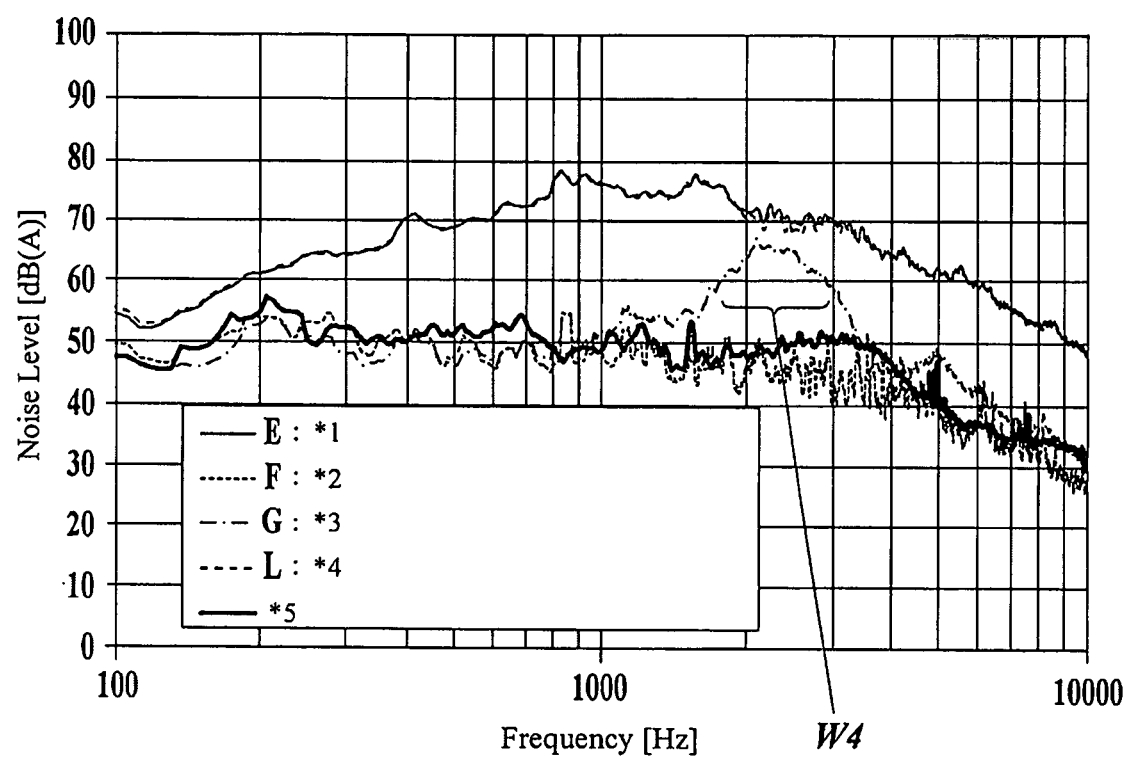
FIG. 6 is a graph showing test results with respect to noise relating a through-hole for a bolt.

FIG. 5 is a graph showing results of noise tests relating to radial fins and circumferential ribs. FIG. 6 is a graph showing results of noise tests relating to through-holes for bolts.

FIG. 5 and FIG. 6 show test results with respect to a conventional brake disc. The term "conventional brake disc" means a brake disc which has radial fins, circumferential ribs, and through-holes for bolt, in which the circumferential ribs are in the shape illustrated by a chain double-dashed line in FIG. 3B, and the groove 15 is not provided in the front face part of the disc plate portion. In FIG. 5 and FIG. 6, a graph line E represents the noise level when the conventional brake disc is rotated at high speed together with a wheel. A graph line L represents the noise level when the conventional brake disc is rotated at high speed together with a wheel in a state in which only the through-holes for bolts are blocked up. A graph line H in FIG. 5 represents the noise level when the conventional brake disc is rotated at high speed together with a wheel in a state in which all portions are blocked up except for opening portions on the outer circumferential side of flow paths for air of pairs of adjacent radial fins. A graph line I in FIG. 5 represents the noise level when the conventional brake disc is rotated at high speed together with a wheel in a state in which all portions are blocked up except for opening portions on the inner circumferential side of the aforementioned flow paths for air. A graph line F in FIG. 6 represents the noise level when the conventional brake disc is rotated at high speed together with a wheel in a state in which the aforementioned opening portions on the inner circumferential side and outer circumferential side of the flow paths for air and the through-holes for bolts are blocked up. A graph line G in FIG. 6 represents the noise level when the conventional brake disc is rotated at high speed together with a wheel in a state in which all portions are blocked up except for the through-holes for bolts.

As a result of conducting the tests it was found that the noise of the conventional brake disc includes noise that arises which is attributable to the radial fins at opening portions on the outer circumferential side or inner circumferential side of the aforementioned flow path for air, noise that arises which is attributable to the circumferential ribs within the aforementioned flow path for air, and noise that arises due to the through-holes for bolts.

The noise in a range W3 of the graph line I in FIG. 5 is estimated to be noise which is attributable to radial fins at opening portions on the inner circumferential side. Further, the noise in a range W2 of the graph line H in FIG. 5 is estimated to be noise which is attributable to radial fins at opening portions on the outer circumferential side. In addition, the noise in a range W1 in which a difference between the graph lines E and L and the graph lines H and I is large is estimated to be noise which is generated when an airflow within the flow path is disturbed by a circumferential rib. Further, the noise in a range W4 of the graph line G in FIG. 6 is estimated to be noise which is attributable to the through-holes for bolts. The noise level of the graph line L for the time when only the through-holes for bolts were blocked up in the range W4 is 1 to 2 dB lower than the noise level for the graph line E. Based on this fact, it is considered that the noise which is attributable to the through-holes for bolts in the range W4 is of the same level as the noise attributable to airflows that flow through a flow path on the disk rear face.

As shown in FIG. 5, the noise level of the brake disc 10 of the first embodiment which is shown in the range W1 is reduced by a large margin in comparison to the conventional brake disc. The reason is considered to be that fluctuations in an airflow that passed the circumferential rib 13 are suppressed significantly by the gradual slope of the circumferential rib 13. Therefore, it is found that, according to the brake disc 10 of the first embodiment, noise is reduced by a large margin without the flow rate of air that releases heat from the brake disc 10 decreasing significantly.

As shown in FIG. 6, the noise of the brake disc 10A of the second embodiment which is shown in the range W4 that was generated by through-holes is reduced by a large margin in comparison to the graph line G which represents the noise level when only bolt holes were open. It is considered that this is because the annular groove 15 is provided so as to link the plurality of through-holes 12. Thus, it is found that, according to the brake disc 10A of the second embodiment, by reducing the noise attributable to the through-holes 12, the noise level is reduced by a large margin in comparison to the conventional brake disc. However, it is taken as a premise that noise of the same frequency range which is produced by other factors such as an airflow that flows along a flow path on the rear face of the disc plate portion is reduced.

While a first embodiment and a second embodiment of the present invention have been described above, the present invention is not limited to the foregoing embodiments. For example, the placement of the circumferential ribs 13 can be changed in various ways, such as providing the circumferential ribs 13 on the inner circumferential portion or outer circumferential portion of the disc plate portion, or midway between the inner circumferential portion and the outer circumferential portion. Further, a structure that narrows a flow path for air between pairs of radial fins by means of circumferential ribs is not limited to a structure in the above embodiments. The circumferential rib 13 of the foregoing embodiments has a structure that connects a pair of radial fins that are adjacent, and in which the height in the rotational axis direction of the disc plate portion is lower than the height of the radial fin. However, for example, the circumferential rib may have a structure that has the same height as the radial fin, but in which the extent of the circumferential rib in the lateral direction (extent in the circumferential direction of the disc plate portion) does not extend over the whole area between the pair of radial fins and leaves a part of the region over which the circumferential rib does not extend. In other words, the circumferential rib may have a structure in which there is a flow path for air between the radial fins and the circumferential rib, or in which there is a flow path for air between the circumferential rib that is connected to a radial fin on one side and the other radial fin. In this case, the vertex portion of the circumferential rib corresponds to an end in the rotational axis direction of the disc plate portion (end facing the flow path for air). In addition, in this case also the circumferential rib may be provided at various positions such as at an inner circumferential portion or outer circumferential portion of the disc plate portion, or midway between the inner circumferential portion and the outer circumferential portion. Further, although in the embodiments described above a structure is adopted in which the top part of all of the radial fins contacts one side of the wheel, a structure may be adopted in which a small gap arises between the top part of some of the radial fins and one side of the wheel. In addition, although in the embodiments described above the radial fins are made approximately the same length as the length in the radial direction of the disc plate portion, the radial fins may have a structure that has a shorter length than the length in the radial direction of the disc plate portion. Further, the groove 15 need not be formed to be along the same diameter of the disc plate portion. Even in such a case, a noise reducing effect is obtained. In addition, the details described in the embodiments can be appropriately changed within a range that does not depart from the gist of the invention.

Third Embodiment

Figure 8:
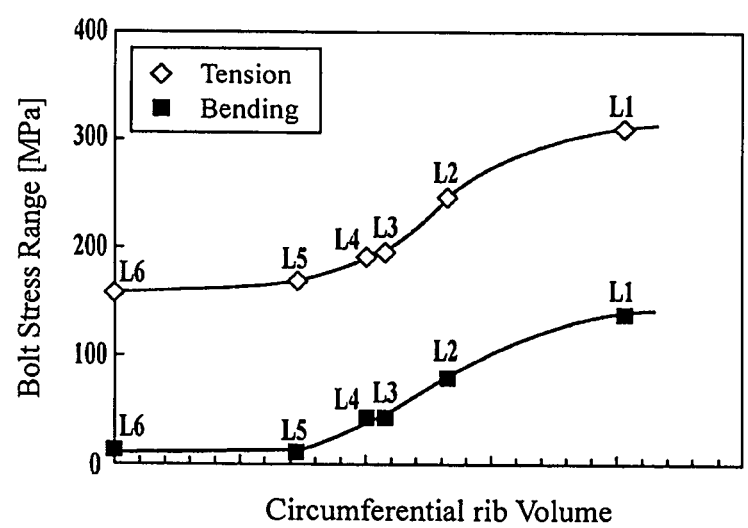
FIG. 8 is a graph that illustrates the relation between the volume of a circumferential rib and a bolt stress range.

FIG. 8 is a graph that illustrates the relation between the volume of a circumferential rib and a bolt stress range. Here, the term "bolt stress range" refers to a fluctuation range from stress that arises in a bolt in a state in which a disc does not thermally expand to stress that arises in a bolt in a state in which a disc thermally expanded. FIG. 9 is a chart for describing each of a first form L1 to a fifth form L5 of a circumferential rib and a comparative form L6 shown in FIG. 8.

Hereunder, a direction along the plate surface of the brake disc 10 is defined as the horizontal direction, a direction perpendicular to the plate surface is defined as the height direction, and the circumferential direction of the brake disc 10 is defined as the circumferential direction of each portion.

The brake disc 10 thermally expands due to frictional heat during braking of a railway vehicle, and as a result the tensile stress and bending stress of the bolt changes. The ordinate in FIG. 8 represents the stress range (difference between highest value and lowest value) of tensile stress and bending stress that arises in a bolt when a certain temperature change is applied to the brake disc 10. The abscissa in FIG. 8 represents the volume of the circumferential rib. The respective values plotted on the graphs in FIG. 8 represent a stress range with respect to the volume of the circumferential rib when circumferential ribs 13 of the first form L1 to the fifth form L5 in FIG. 9 are adopted as well as for the comparative form L6 (case without a circumferential rib).

In the circumferential ribs 13 of the first form L1 to the fifth form L5 in FIG. 9, the height is constant, and the length of a top-part horizontal portion Ld, the shape of a top-part gradual slope SL0 and the shape of a base-part gradual slope SL1 differ as shown in the chart in FIG. 9. The term "top-part horizontal portion Ld" refers to a horizontal region that is provided at the vertex portion of the circumferential rib 13. The term "top-part gradual slope SL0" refers to a sloped portion from the vertex portion of the circumferential rib 13 to a base part or an interruption portion. The term "base-part gradual slope SL1" refers to a sloped portion of the base part of the circumferential rib 13. The character "R" in the chart denotes radius of curvature [mm]. The top-part gradual slope SL0 and the base-part gradual slope SL1 are disposed on the inner circumferential side of the circumferential rib 13.

As illustrated in the graph in FIG. 8, the stress range of the bolt changes depending on the volume of the circumferential rib 13 that is located in the vicinity of the bolt. For example, if the circumferential rib 13 has a shape as illustrated in the first form L1 in FIG. 9 that has a large volume, the rigidity of the circumferential rib 13 will be large and hence the stress range of the bolt will be large. On the other hand, if the circumferential rib 13 has a shape as illustrated in the fifth form L5 in FIG. 9 that has a small volume, the rigidity of the circumferential rib 13 will be relatively small, and hence the stress range of the bolt will also be small. Based on the graph in FIG. 8, by making the volume of the circumferential rib 13 less than or equal to that of the fifth form L5, the stress range of the bolt will be equal to the stress range in the case of the comparative form L6 in which there is no circumferential rib 13.

As described above, in a case where the volume of the circumferential rib 13 is increased to reduce the noise, the problem arises that the stress range of the bolt increases. Therefore, the brake disc of the third embodiment has a circumferential rib 13A (see FIG. 10) that can reduce noise without large increase in the stress range of a bolt.

Figure 10:
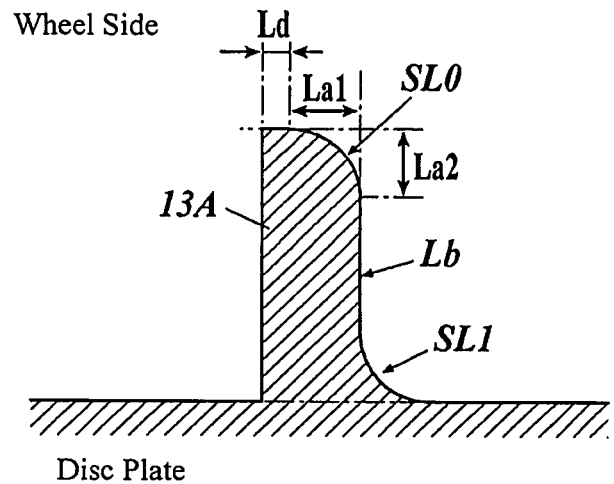
FIG. 10 is a view for describing a circumferential rib of the third embodiment.
Figure 11:
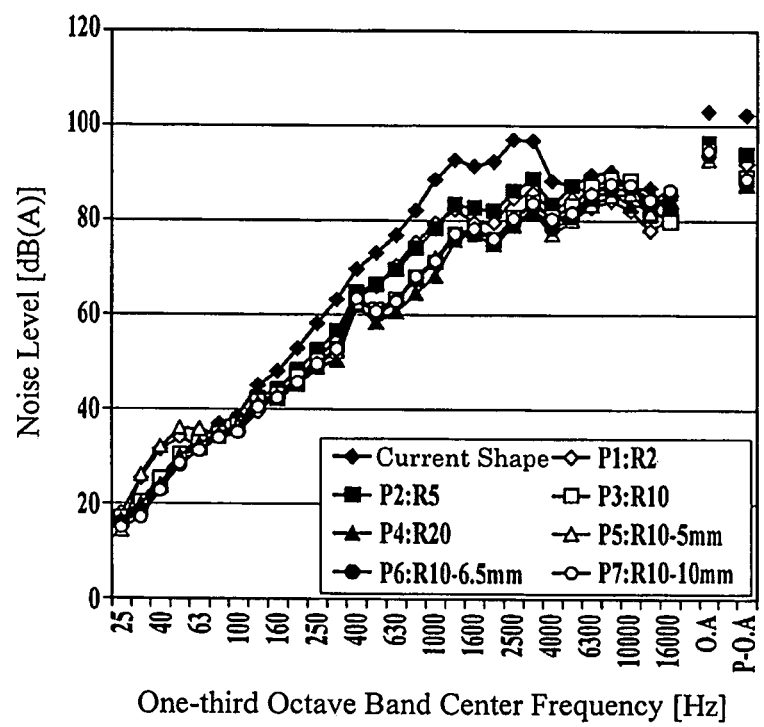
FIG. 11 is a frequency graph showing a comparison of noise levels between circumferential ribs of the third embodiment and a conventional circumferential rib.

FIG. 10 is a view for describing the circumferential rib of the third embodiment. FIG. 11 is a frequency graph showing a comparison of the noise levels between the circumferential ribs of the third embodiment and a conventional circumferential rib. FIG. 12 is a chart showing the forms of the circumferential ribs that are compared in FIG. 11.

The circumferential rib 13A of the third embodiment includes a top-part gradual slope SL0 on the inner circumferential side. The top-part gradual slope SL0 is provided in the range of a section La1 in a radial direction of the disc plate portion on the inner circumferential side of the circumferential rib 13A, and in the range of a section La2 in the rotational axis direction of the disc from the vertex of the circumferential rib 13A. Preferably, the top-part gradual slope SL0 is provided at least in an area where both of the sections La1 and La2 are 2 mm or more, and is a convex curved face having an R of 2 mm or a sloping face that is more gradual than such a convex curved face. Further preferably, the top-part gradual slope SL0 is provided at least in an area where both of the sections La1 and La2 are 5 mm or more, and is a convex curved face having an R of 5 mm or a sloping face that is more gradual than such a convex curved face.

The circumferential rib 13A of the third embodiment further includes, on the inner circumferential side, a straight line section Lb that extends to the top-part gradual slope, and a base-part gradual slope SL1. It suffices to make the straight line section Lb near to vertical within a manufacturable range. By this means, the volume of the circumferential rib 13A can be made small. Further, if a margin exists with respect to the bolt stress range, the straight line section Lb may be provided with an inclination. Further, the straight line section Lb may be configured as a curved surface section that has a gradual curvature.

The base-part gradual slope SL1 is, for example, a concave curved face having an R of 5 mm. However, the base-part gradual slope SL1 may also be a flat surface or a curved surface with a slope that is easy to manufacture. Further, the base-part gradual slope SL1 may be omitted to the extent allowed within a manufacturable range.

Further, the circumferential rib 13A of the third embodiment may include a top-part horizontal portion Ld, or need not include a top-part horizontal portion Ld. In a case where the circumferential rib 13A includes a top-part horizontal portion Ld, the range of the top-part horizontal portion Ld is preferably made around 1 mm to 20 mm. The larger the top-part horizontal portion Ld is, the greater the volume of the circumferential rib 13A becomes, and the greater the influence thereof on the stress range of a bolt. Therefore, it suffices to set the size of the top-part horizontal portion Ld to an appropriate size in consideration of the bolt stress range and the required strength of the circumferential rib 13A. In addition, the outer circumferential side of the circumferential rib 13A may be formed as a vertical structure or may be provided with a gradual slope within a manufacturable range. As the slope of the outer circumferential side of the circumferential rib 13A becomes more gradual, the volume of the circumferential rib 13A becomes larger and the bolt stress range increases. Therefore, it suffices to appropriately set the outer circumferential side of the circumferential rib 13A within a range such that there is some margin in the bolt stress range. Further, the height of the circumferential rib 13A can be appropriately adjusted by means of the length of the straight line section Lb.

<Actions and Effects>

Figure 13:
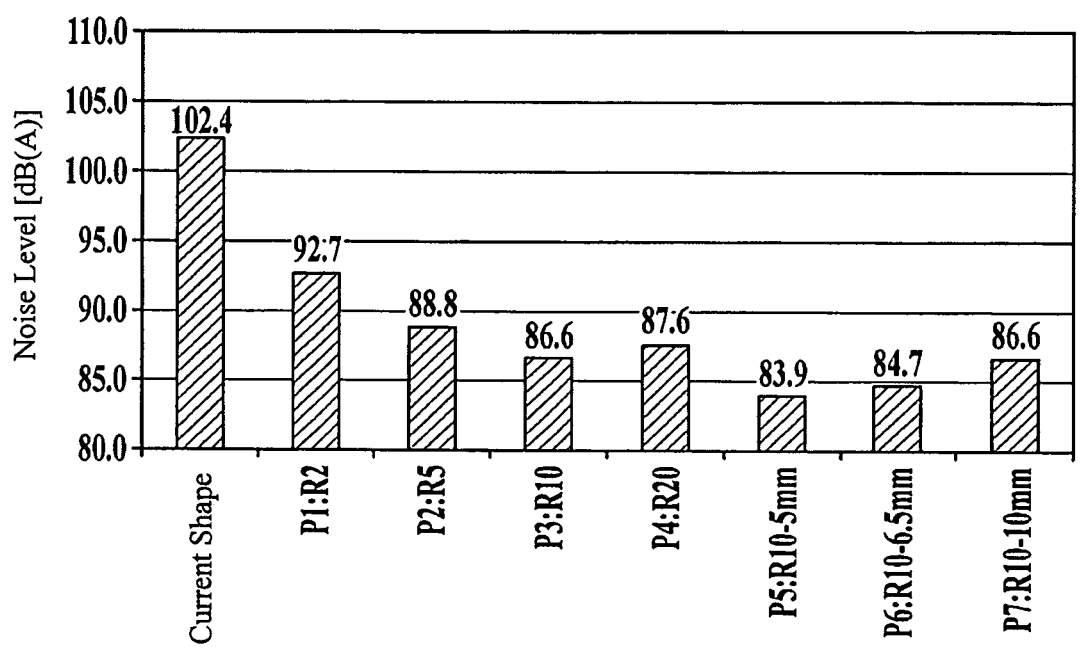
FIG. 13 is a graph which compares overall noise levels of prescribed frequency ranges.

FIG. 11 is a frequency graph that shows a comparison between the noise of circumferential ribs of the third embodiment and a conventional circumferential rib. FIG. 12 is a chart showing the shapes of the circumferential ribs in FIG. 11. FIG. 13 is a graph in which overall noise levels in a range from 400 Hz to 5000 Hz are compared.

In this case, a partial model of the area between a pair of adjacent radial fins 11a and 11b was created, air was caused to flow therethrough at a predetermined air velocity, and the noise was measured. The flow path for air between the radial fins 11a and 11b was placed, in a simulated manner, in a state in which the flow path was enclosed by one side of the disc plate portion and one side of the plate portion of the wheel 100. Further, the circumferential rib 13A was disposed so as to block one part of the flow path. The ordinate in FIG. 11 represents the noise level of each frequency band, and the abscissa in FIG. 11 represents the center frequency of a one-third octave band. Further, "O.A" described on the abscissa represents "overall", and "P-O.A" described on the abscissa represents overall in a range of 400 Hz to 5000 Hz.

In this case, noise was measured for the circumferential ribs 13A from the first form P1 to the seventh form P7 in FIG. 12. In the chart in FIG. 12, "R" denotes the radius of curvature [mm], "top-part gradual slope shape" denotes the radius of curvature of the convex curved face of the top-part gradual slope SL0, and "base-part gradual slope shape" denotes the radius of curvature of the concave curved face of the base-part gradual slope SL1 in FIG. 10. Further, as a comparison object, a circumferential rib having a current shape that was formed in a cross-sectionally rectangular shape by cutting was also tested along with the circumferential ribs.

As illustrated in FIG. 11, it was confirmed that when the circumferential ribs 13A of the first form P1 to the seventh form P7 were adopted, the noise level could be reduced in comparison to the circumferential rib with the current shape. Further, when the overall noise levels in the range of 400 Hz to 5000 Hz were compared, as illustrated in FIG. 13, it was confirmed that, in comparison to the current shape, the noise level can be markedly reduced by adopting the first form P1 to the seventh form P7.

Note that, when measuring these respective noises, slight differences arose in the air quantity (flow velocity) that passed between the pair of radial fins 11a and 11b due to differences in the shapes of the circumferential ribs 13A. In the case of the actual brake disc 10, the air quantity is set to a predetermined value by adjusting the height of the circumferential rib 13A so that an appropriate cooling effect is obtained. Further, the flow velocity influences the noise level. Therefore, with regard to the values of the graph in FIG. 13, a correction was performed so as to remove variations in the noise levels caused by variations in the flow velocity.

In FIG. 13, based on a comparison of the test results for the third form P3 and the seventh form P7, it is found that the slope of the straight line section Lb does not significantly influence the noise level. Further, based on a comparison of the test results for the first form P1 to the third form P3, it was confirmed that the section La2 and shape of the top-part gradual slope SL0 influence the noise level.

Further, it was confirmed that when the circumferential rib 13A is the first form P1 in which the top-part gradual slope SL0 is made a convex curved face having the section La1 and section La2 that are each 2 mm and a radius of curvature R of 2 mm, the overall noise level in the range of 400 Hz to 5000 Hz can be reduced by approximately 10 dB (A) relative to the current shape. In addition, when the circumferential rib 13A is the second form P2 in which the top-part gradual slope SL0 is made a convex curved face having the section La1 and section La2 that are each 5 mm and a radius of curvature R of 5 mm, the overall noise level in the range of 400 Hz to 5000 Hz can be reduced by approximately 14 dB relative to the current shape. Furthermore, when the circumferential rib 13A is the fifth form P5 in which the top-part gradual slope SL0 is made a convex curved face having the section La1 and section La2 that are each 5 mm and a radius of curvature R of 10 mm, the overall noise level in the range of 400 Hz to 5000 Hz can be reduced by 18.5 dB relative to the current shape.

Based on these test results, it is found that according to the circumferential rib 13A of the third embodiment, the noise level can be markedly reduced.

As described above, according to the brake disc 10 of the third embodiment, the level of noise that arises at the location of the circumferential rib 13A can be markedly reduced without large increase in the bolt stress range.

Fourth Embodiment

Figure 14:
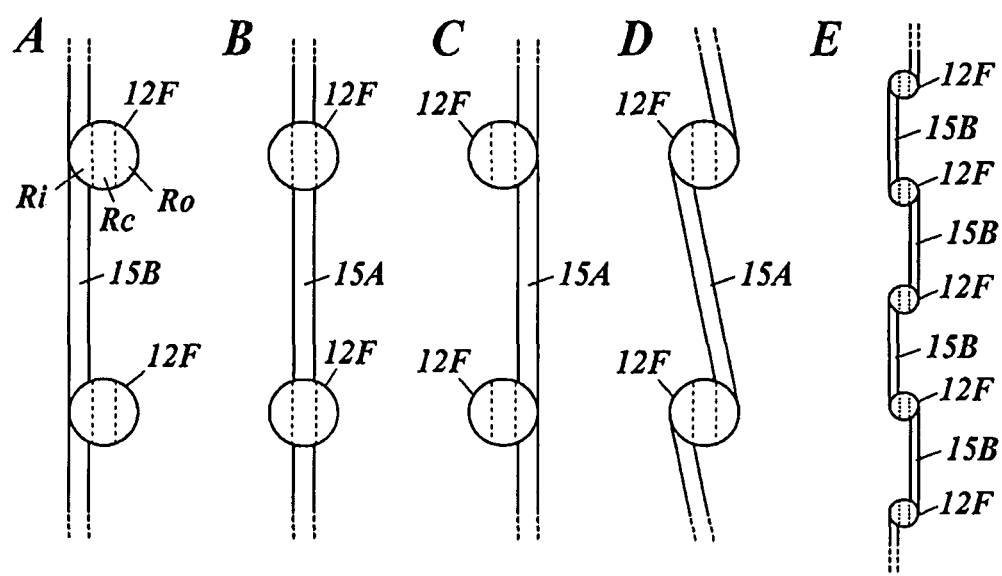

FIG. 14 is a multiple view drawing for describing forms of a groove that is provided in a front face of a disc plate portion, in which FIG. 14A to FIG. 14E show a first form to a fifth form of the groove, respectively. Note that FIG. 14 shows views that were subjected to coordinate transformation so that the circumferential direction and radial direction of the brake disc 10A become straight line directions which are orthogonal to each other in one section of grooves 15A and 15B.

In the brake disc 10A of the fourth embodiment, a groove 15A having a small width is adopted instead of the groove 15 of the second embodiment. The width of the groove 15A is smaller than the diameter of an opening portion 12F on a front face side (sliding surface side of the brake disc 10A) of the disc plate portion of the through-hole 12. Specifically, the diameter of the opening portion 12F is, for example, 36 mm, and the width of the groove 15A is, for example, 5 mm, 10 mm, 20 mm or the like. In a case where the opening portion 12F is not circular, the width of the groove 15A is smaller than the width of the opening portion 12F in the radial direction of the disc plate portion. The term "width of the groove 15A" means the width of the groove 15A in the radial direction of the disc plate portion.

The sliding-contact member 200 contacts the front face of the brake disc 10A to generate a braking force. Therefore, the groove 15A that is provided in the sliding surface of the brake disc 10A decreases the sliding surface. When the sliding surface decreases, if the pressure of the sliding-contact member 200 is the same, it results in an action that reduces the braking force. Further, when the width or depth of the groove 15A increases, it results in an action that reduces the strength of the brake disc 10A.

The groove 15A having a narrow width as described above is adopted for the brake disc 10A of the fourth embodiment. Therefore, in the fourth embodiment it is possible to secure the area of the sliding surface of the brake disc 10A and maintain the strength of the brake disc 10A while reducing noise that arises at the through-holes for bolts 12 by means of the groove 15A.

In a case where the groove 15A having a narrow width is adopted, there are variations with respect to the form of connection between pairs of adjacent opening portions 12F and the groove 15A. Examples of such variations include a pattern in which the groove 15A connects inner circumferential portions Ri of a pair of adjacent opening portions 12F (FIG. 14A), a pattern in which the groove 15A connects center portions Rc of adjacent opening portions 12F (FIG. 14B), and a pattern in which the groove 15A connects outer circumferential portions Ro of adjacent opening portions 12F (FIG. 14C). In addition, there is a pattern in which, among a pair of adjacent opening portions 12F, the groove 15A diagonally connects from the outer circumferential portion Ro of one of the opening portions 12F to the inner circumferential portion Ri of the other opening portion 12F (FIG. 14D). In addition, there is a pattern (hereinafter, referred to as "staggered"; FIG. 14E) in which a connection between the inner circumferential portions Ri and a connection between the outer circumferential portions Ro of pairs of adjacent opening portions 12F are alternately repeated and the like. The terms "inner circumferential portion Ri", "center portion Rc" and "outer circumferential portion Ro" refer to the respective portions when the opening portion 12F is divided into three portions at equal intervals in the radial direction of the brake disc 10A.

With respect to the connection patterns of the groove 15A of the fourth embodiment, the connection patterns from FIG. 14B to FIG. 14D are included among the aforementioned plurality of patterns, and the connection patterns of a groove 15B illustrated in FIG. 14A and FIG. 14E are excluded.

That is, in the fourth embodiment, in a case where the width of the groove 15A is not more than one half of the diameter of the opening portion 12F, with respect to the connection locations between the groove 15A and the opening portions 12F, a connection location excluding the inner circumferential portion Ri of the opening portion 12F is adopted for the connection with at least one of the pair of opening portions 12F and 12F. The term "connection location excluding the inner circumferential portion Ri" means the center portion Rc, the outer circumferential portion Ro, or a portion that straddles the center portion Rc and the outer circumferential portion Ro of the opening portion 12F. For example, a width of 5 mm or 10 mm or the like is appropriate as the width of the groove 15A.

Further, in the fourth embodiment, in a case where the width of the groove 15A is greater than one half of the diameter of the opening portion 12F, with respect to the connection locations between the groove 15A and the opening portions 12F, a connection location that does not include an inner circumference end of the opening portion 12F is adopted for the connection with at least one of the pair of opening portions 12F and 12F. The term "inner circumference end" refers to an end portion of the opening portion 12F that is nearest the inner circumference of the brake disc 10A. A case where the width of the groove 15A is greater than one half of the diameter of the opening portion 12F is, for example, a case where the groove width is 20 mm. Note that, irrespective of the groove width and connection locations, the groove 15A preferably has a depth such that the bottom of the groove is located at a height that is substantially equal to the height of the vertex portion of a bolt or a nut.

<Actions and Effects>

Figure 15:
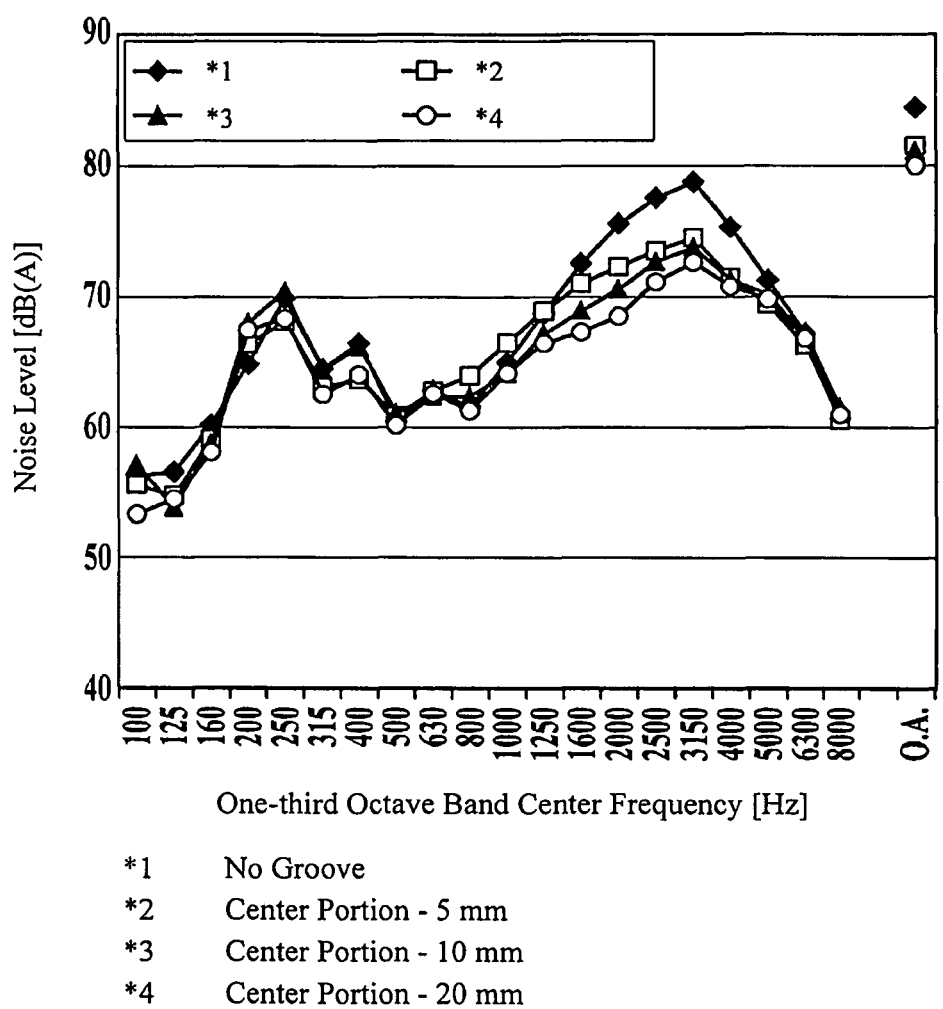
FIG. 15 is a frequency graph illustrating the relation between the width of grooves and the noise level.
Figure 16:
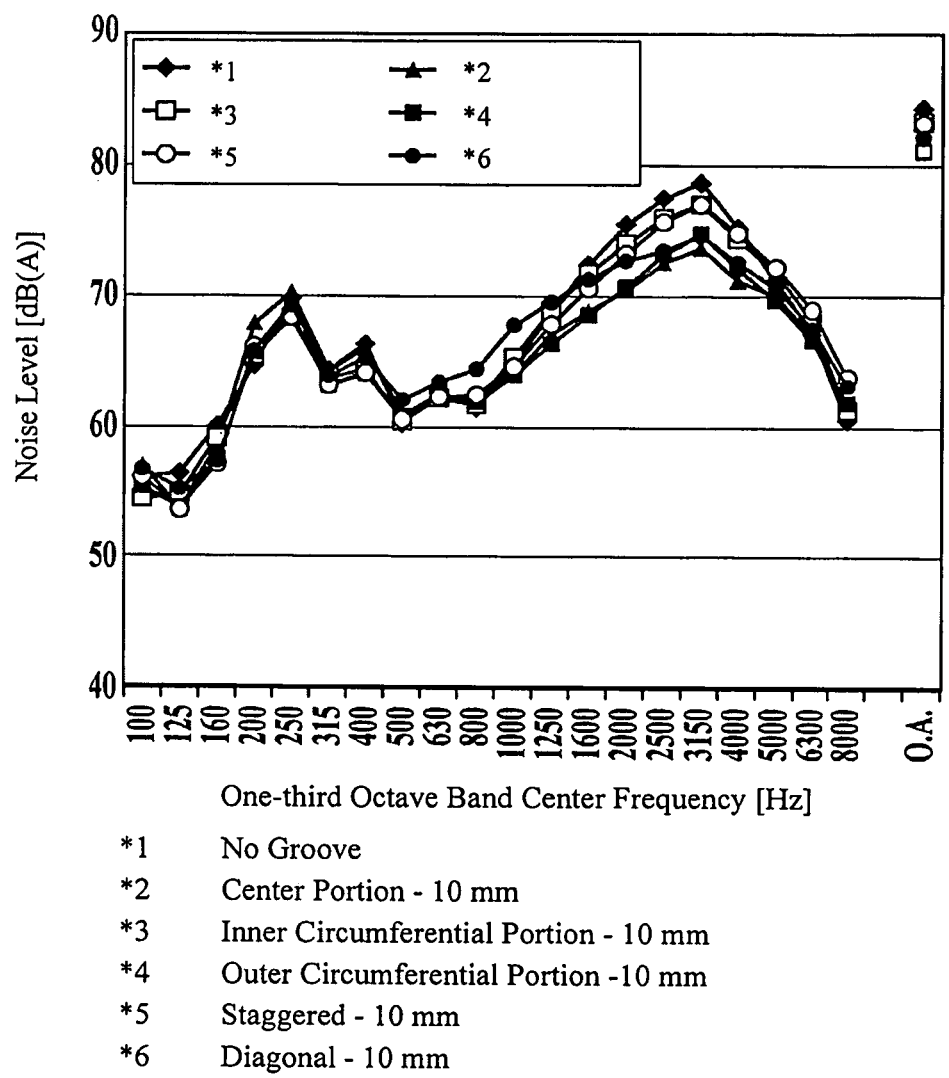
FIG. 16 is a frequency graph illustrating the relation between connection locations of grooves and the noise level.
Figure 17:
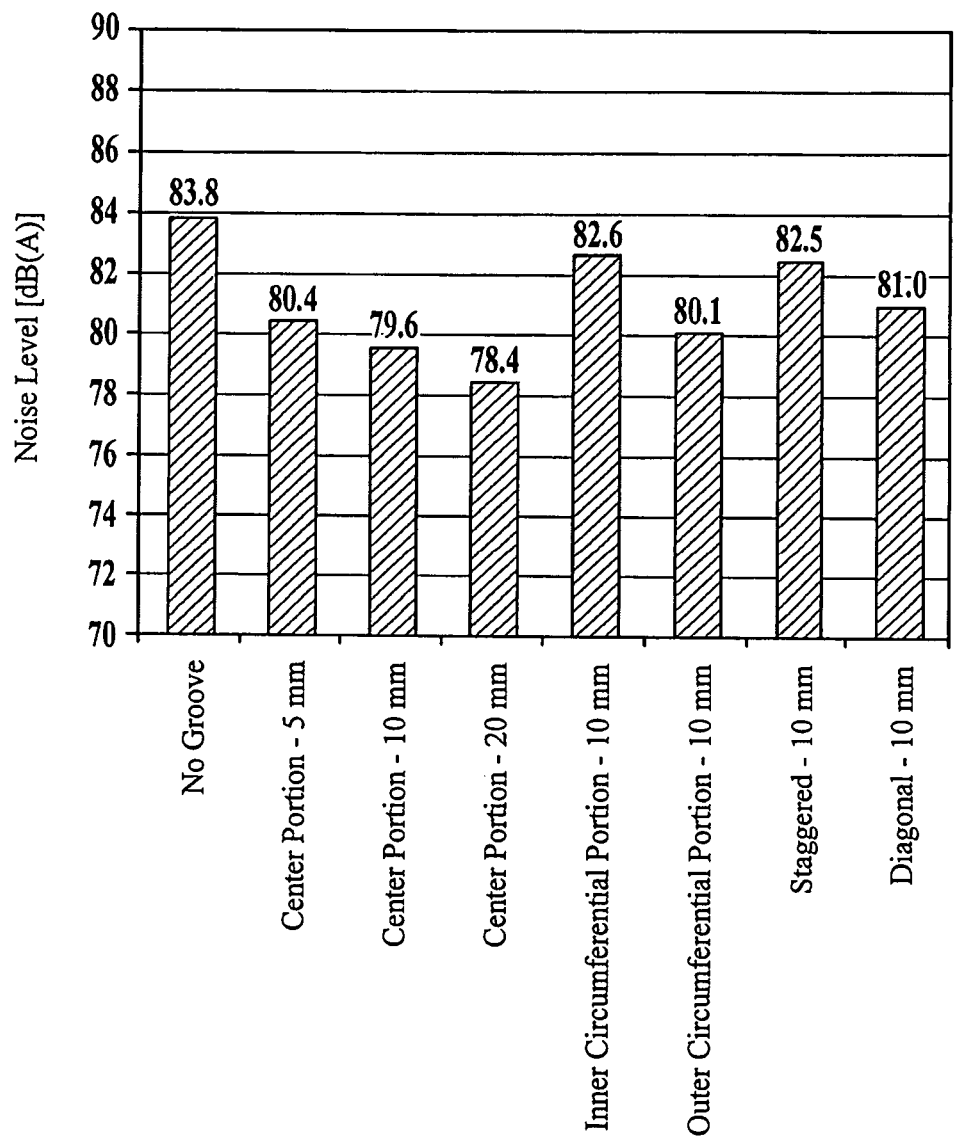
FIG. 17 is a graph illustrating the relation between a connection form of a groove and the overall noise level of prescribed frequency ranges.

FIG. 15 is a graph showing the relation between the frequency of noise and the noise level for each groove width. FIG. 16 is a graph showing the relation between the frequency of noise and the noise level for each connection location of the groove. FIG. 17 is a graph showing the noise level in a frequency range from the 1250 Hz band to the 5000 Hz band for each connection form of the groove. In these drawings, the forms of the plurality of grooves that are the objects are described in the format "connection location—groove width". In the form "center portion—20 mm", although the groove 15A is connected to a part of the outer circumferential portion Ro and also a part of the inner circumferential portion Ri of the opening portion 12F since the groove 15A is one half or more of the diameter of the opening portion 12F, the form is shown as one in which the center of the groove 15A is connected so as to overlap with the center of the center portion Rc. The ordinate in FIG. 15 and FIG. 16 represents the noise level for each one-third octave band, and the abscissa in FIG. 15 and FIG. 16 represents the center frequency for each one-third octave band. The ordinate in FIG. 17 represents the noise level in the frequency range from 1250 Hz to 5000 Hz.

Among the forms that are the objects, the patterns "center—5 mm", "center—10 mm", "center—20 mm", "outer circumference—10 mm" and "diagonal—10 mm" are examples of forms that are adopted in the fourth embodiment. The patterns "no groove", "inner circumference—10 mm" and "staggered—10 mm" are examples of comparative forms that are not adopted in the fourth embodiment.

Based on the results shown in FIG. 15, it is found that when the width of the groove 15A is narrowed, the noise reduction effect gradually decreases. On the other hand, based on the results in FIG. 15, it is found that in comparison to the case where there is no groove, a noise reduction effect is obtained even when there is a groove with a width of only 5 mm. Further, based on the results in FIG. 16 it is found that, in a case where the width of the groove 15A is narrow, the noise reduction effect varies depending on the connection location with respect to the pair of adjacent opening portions 12F.

Further, based on the results in FIG. 17 it is found that, although noise is reduced by the pattern "inner circumference—10 mm" and the pattern "staggered—10 mm", the effect is small, while in contrast, a noticeable noise reduction effect is obtained by the patterns adopted in the fourth embodiment. Based on these results it is found that, by adopting the aforementioned connection forms between the groove 15A and the opening portions 12F, noise that is generated at the location of the groove 15A can be markedly reduced.

As described above, according to the brake disc 10A of the fourth embodiment, noise that arises due to the through-holes for a bolt 12 can be markedly reduced without significantly reducing the sliding area.

INDUSTRIAL APPLICABILITY

The present invention can be utilized in a brake disc for a railway vehicle.

REFERENCE SIGNS LIST 10, 10A Brake Disc
10f Front Face (Sliding Portion)

10r Rear Face
11a, 11b Radial fin
12 Through-hole
12F Opening Portion
13, 13A Circumferential rib
13a Side Face on Inner Circumferential Side
13b Side Face on Outer Circumferential Side
15, 15A, 15B Groove
La1, La2 Section of Top-part Gradual Slope
Lb Straight Line Section
Ri Inner Circumferential Portion
Rc Center Portion
Ro Outer Circumferential Portion
SL0 Top-part Gradual Slope
SL1 Base-part Gradual Slope

The invention claimed is:

1. A brake disc for a railway vehicle, the brake disc comprising:
    one and only one disc plate portion having a sliding portion on a front face, the disc plate portion having a monolithic annular shape,
    a plurality of substantially straight radial fins provided on a rear face of the disc plate portion and having a shape extending in a radial direction from an inner circumferential side to an outer circumferential side of the rear face of the disc plate portion, the disk plate portion being disposed on one side of the plurality of the radial fins so that the brake disk is open on another side opposite to the one side, and
    a circumferential rib provided between each pair of radial fins that are adjacent among the plurality of radial fins, and having a shape extending in a circumferential direction of the disc plate portion, along a radius that does not vary, wherein:
    a flow path for air that runs from an inner circumferential side to an outer circumferential side of the disc plate portion is formed between the pair of radial fins in a state in which the disc plate portion is fastened to a wheel of the railway vehicle, and the flow path for air is narrowed by the circumferential rib; and
    a gradual slope for suppressing fluctuations in an airflow that passes between the pair of radial fins is provided on the circumferential rib on a side face along the radial direction of the disc plate portion.

2. The brake disc for a railway vehicle according to claim 1, wherein the gradual slope is provided on one side face of the circumferential rib that faces the inner circumferential side along the radial direction of the disc plate portion, or is provided on both side faces of the circumferential rib that face the inner circumferential side and the outer circumferential side, respectively, along the radial direction of the disc plate portion.

3. The brake disc for a railway vehicle according to claim 1, wherein:
    the gradual slope includes a top-part gradual slope that is provided at least at a top part of the circumferential rib, and
    the top-part gradual slope is a convex curved face having a radius of curvature of 2 mm, the top-part gradual slope being provided at a side portion facing the inner circumferential side of the disc plate portion, at a first section of 2 mm or more in the radial direction of the disc plate portion, and at a second section of 2 mm or more in a rotational axis direction of the disc plate portion from a vertex of the circumferential rib.

4. The brake disc for a railway vehicle according to claim 1, wherein:
    the gradual slope includes a top-part gradual slope that is provided at least at a top part of the circumferential rib, and
    the top-part gradual slope is a convex curved face having a radius of curvature of 5 mm, the top-part gradual slope being provided at a side portion facing the inner circumferential side of the disc plate portion, at a first section of 5 mm or more in the radial direction of the disc plate portion, and at a second section of 5 mm or more in a rotational axis direction of the disc plate portion from a vertex of the circumferential rib.

5. The brake disc for a railway vehicle according to claim 1, wherein the circumferential rib connects the pair of radial fins, and having a flow path for air between the wheel and the circumferential rib.

6. The brake disc for a railway vehicle according to claim 1, wherein:
    the gradual slope includes a top-part gradual slope that is provided at least at a top part of the circumferential rib, and
    the top-part gradual slope is a sloping face which is more gradual than a convex curved face having a radius of curvature of 2 mm, the top-part gradual slope being provided at a side portion facing the inner circumferential side of the disc plate portion, at a first section of 2 mm or more in the radial direction of the disc plate portion, and at a second section of 2 mm or more in a rotational axis direction of the disc plate portion from a vertex of the circumferential rib.

7. The brake disc for a railway vehicle according to claim 1, wherein:
    the gradual slope includes a top-part gradual slope that is provided at least at a top part of the circumferential rib, and
    the top-part gradual slope is a sloping face which is more gradual than a convex curved face having a radius of curvature of 5 mm, the top-part gradual slope being provided at a side portion facing the inner circumferential side of the disc plate portion, at a first section of 5 mm or more in the radial direction of the disc plate portion, and at a second section of 5 mm or more in a rotational axis direction of the disc plate portion from a vertex of the circumferential rib.

* * * * *